United States Patent
Zhang et al.

(10) Patent No.: US 12,108,350 B2
(45) Date of Patent: Oct. 1, 2024

(54) METHODS AND APPARATUSES FOR LOGICAL TSN BRIDGE

(71) Applicant: Telefonaktiebolaget LM Ericsson (publ), Stockholm (SE)

(72) Inventors: Kefeng Zhang, Beijing (CN); Kun Wang, Solna (SE); Marilet De Andrade Jardim, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 322 days.

(21) Appl. No.: 17/616,706

(22) PCT Filed: Dec. 30, 2019

(86) PCT No.: PCT/CN2019/129954
§ 371 (c)(1),
(2) Date: Dec. 6, 2021

(87) PCT Pub. No.: WO2020/248582
PCT Pub. Date: Dec. 17, 2020

(65) Prior Publication Data
US 2022/0322254 A1    Oct. 6, 2022

(30) Foreign Application Priority Data
Jun. 12, 2019    (WO) ................ PCT/CN2019/091003

(51) Int. Cl.
*H04W 56/00* (2009.01)
*H04L 47/28* (2022.01)
(Continued)

(52) U.S. Cl.
CPC ........... *H04W 56/001* (2013.01); *H04L 47/28* (2013.01); *H04L 67/34* (2013.01); *H04W 76/15* (2018.02); *H04W 80/10* (2013.01); *H04W 92/02* (2013.01)

(58) Field of Classification Search
CPC ... H04W 56/001; H04W 76/15; H04W 80/10; H04W 92/02; H04W 88/16; H04W 72/04;
(Continued)

(56) References Cited

U.S. PATENT DOCUMENTS

| 2015/0110006 A1 | 4/2015 | Avula et al. |
| 2019/0007941 A1 | 1/2019 | Cavalcanti et al. |

(Continued)

FOREIGN PATENT DOCUMENTS

| CN | 100336333 C | 9/2007 |
| CN | 109639493 A | 4/2019 |

(Continued)

OTHER PUBLICATIONS

NPL Document, System architecture for the 5G system; Stage 2 (Release 16) V16.1.0 (Jun. 2019) (Year: 2019).*
(Continued)

*Primary Examiner* — Mewale A Ambaye
(74) *Attorney, Agent, or Firm* — Murphy, Bilak & Homiller, PLLC

(57) ABSTRACT

Methods and apparatuses for logical time sensitive network (TSN) bridge are disclosed. According to an embodiment, a session management node receives, from a mobility management node in a mobile network, a first request for establishing a protocol data unit (PDU) session for a terminal device which is associated with a port of a logical TSN bridge. The session management node obtains a first port number of the logical TSN bridge at the side of the terminal device. The session management node obtains configuration information of the logical TSN bridge at a side of a user plane node corresponding to the PDU session.

15 Claims, 11 Drawing Sheets

(51) Int. Cl.
  *H04L 67/00* (2022.01)
  *H04W 76/15* (2018.01)
  *H04W 80/10* (2009.01)
  *H04W 92/02* (2009.01)
(58) Field of Classification Search
  CPC ........ H04W 67/00; H04L 47/28; H04L 67/34; H04L 69/14
  See application file for complete search history.

(56) References Cited

U.S. PATENT DOCUMENTS

| | | | | |
|---|---|---|---|---|
| 2020/0068047 | A1* | 2/2020 | Huang | H04L 69/08 |
| 2021/0120596 | A1* | 4/2021 | Youn | H04W 76/12 |
| 2022/0116822 | A1* | 4/2022 | Sahin | H04W 28/0835 |
| 2023/0318942 | A1* | 10/2023 | Fan | H04L 41/0853 709/224 |
| 2023/0371054 | A1* | 11/2023 | Xu | H04L 1/0025 |
| 2023/0397155 | A1* | 12/2023 | Ryu | H04W 12/082 |
| 2024/0107576 | A1* | 3/2024 | Xu | H04L 5/0082 |

FOREIGN PATENT DOCUMENTS

| | | |
|---|---|---|
| EP | 3264725 A1 | 1/2018 |
| JP | 2018133612 A | 8/2018 |

OTHER PUBLICATIONS

NPL Document, Procedures for the 5G system; Stage 2 (Release 16) V16.1.1 (Jun. 2019) (Year: 2019).*

3GPP, "3GPP TS 23.501 V16.0.2", 3rd Generation Partnership Project; Technical Specification Group Services and System Aspects; System Architecture for the 5G System; Stage 2 (Release 16), Apr. 2019, 1-317.

3GPP, "3GPP TS 23.502 V15.6.0", 3rd Generation Partnership Project; Technical Specification Group Services and System Aspects; Procedures for the 5G System; Stage 2 (Release 15), Jun. 2019, 1-357.

Ericsson, "5G bridge port allocation and mapping tables", 3GPP TSG-SA WG2 Meeting #134, S2-1907475, Sapporo, JP, Jun. 24-28, 2019, 1-5.

Ericsson, "Support for IEEE 802.1Qbv scheduling", 3GPP TSG-SA WG2 Meeting #132, S2-1903378, (revision of 19xxxx), Xi'an—China, Apr. 8-12, 2019, 1-6.

Huawei, et al., "Address editor's notes for 5GS Bridge management and QoS mapping", 3GPP TSG-SA WG2 Meeting #133, S2-1906772, (rev of S2-1906768), Reno, Nevada, USA, May 13-17, 2019, 1-8.

"5G bridge granularity", 3GPP TSG-SA WG2 Meeting #132, S2-1903364, Xi'an—China, Apr. 8-12, 2019, 6 pages.

"Discussion on 5GS Bridge management and TSN stream establishment", 3GPP TSG-SA WG2 Meeting #133, S2-1905675, Reno, Nevada, USA, May 13-17, 2019, 4 pages.

3GPP, "3rd Generation Partnership Project; Technical Specification Group Services and System Aspects; Procedures for the 5G System; Stage 2 (Release 16)", 3GPP TS 23.502 V16.1.1, Jun. 2019, 1-495.

"BDT renegotiation upon expected network performance change", 3GPP TSG Change Request; 23.502 v16.1.0, Jun. 2019, 1-6.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

* cited by examiner

| Port number | Port location | UE ID | PDU Session ID | N4 Session ID | UPF Port number |
|---|---|---|---|---|---|
| Port-A1 | NW | - | - | - | UP-a1 |
| Port-A2 | NW | - | - | - | UP-a2 |
| Port-B1 | DS | UE-b | PS-b1 | N4-b1 | - |
| Port-B2 | DS | UE-b | PS-b2 | N4-b2 | - |
| Port-C | DS | UE-c | PS-c | N4-c | - |
| ⋮ | ⋮ | ⋮ | ⋮ | ⋮ | ⋮ |
| TSN parameters | 5GS parameters | | | | |

FIG. 7A

| Port number | Port MAC Address | Port location | UE ID | PDU Session ID | N4 Session ID | UPF Port number |
|---|---|---|---|---|---|---|
| Port-A1 | MAC-A1 | NW | - | - | - | UP-a1 |
| Port-A2 | MAC-A2 | NW | - | - | - | UP-a2 |
| Port-B1 | MAC-B1 | DS | UE-b | PS-b1 | N4-b1 | - |
| Port-B2 | MAC-B2 | DS | UE-b | PS-b2 | N4-b2 | - |
| Port-C | MAC-C | DS | UE-c | PS-c | N4-c | - |
| ⋮ | ⋮ | ⋮ | ⋮ | ⋮ | ⋮ | ⋮ |
| TSN parameters | | 5GS parameters | | | | |

FIG. 7B

| Port number | Port location | UE ID | PDU Session ID | N4 Session ID | UPF Port number |
|---|---|---|---|---|---|
| Port-A1 | NW | - | - | - | UP-a1 |
| Port-B1 | DS | UE-b | PS-b1 | N4-b1 | Virtual-UP-a1-b1 |
| Port-B2 | DS | UE-b | PS-b2 | N4-b2 | Virtual-UP-a1-b2 |
| Port-C | DS | UE-c | PS-c | N4-c | Virtual-UP-a1-c |
| ⋮ | ⋮ | ⋮ | ⋮ | ⋮ | ⋮ |
| TSN parameters | 5GS parameters | | | | |

FIG. 8

| Port number | Port location | N4 Session ID | UPF Port number |
|---|---|---|---|
| Port-A1 | NW | -- | UP-a1 |
| Port-A2 | NW | -- | UP-a2 |
| Port-B | DS | N4-b | -- |
| Port-C | DS | N4-c | -- |
| ⋮ | ⋮ | ⋮ | ⋮ |

TSN parameters | 5GS parameters

FIG. 11

```
┌─────────────────────────────────────────┐
│ Send, to a mobility management node in  │
│ a mobile network, a request for         │
│ establishing a PDU session for the      │──1202
│ terminal device associated with a port  │
│ of a logical TSN bridge                 │
└─────────────────────────────────────────┘
                    ↓
┌─────────────────────────────────────────┐
│ Receive, from the mobility management   │
│ node, a first port number of the        │
│ logical TSN bridge at the side of the   │──1204
│ terminal device and a bridge ID of the  │
│ logical TSN bridge                      │
└─────────────────────────────────────────┘
                    ↓
┌─────────────────────────────────────────┐
│ Send, to the mobility management node,  │
│ a port address of the logical TSN       │──1206
│ bridge at the side of the terminal      │
│ device                                  │
└─────────────────────────────────────────┘
```

FIG. 12

| Bridge ID | Port number | UE ID | PDU Session ID |
|---|---|---|---|
| Bridge-A | Port-C | UE-c | PS-c |

TSN parameters / 5GS parameters

FIG. 13

| Bridge ID | Port number | UE ID | PDU Session ID |
|---|---|---|---|
| Bridge-A | Port-B1 | UE-b | PS-b1 |
| Bridge-A | Port-B2 | UE-b | PS-b2 |

TSN parameters / 5GS parameters

FIG. 14

| Bridge ID | Port number | UE ID | PDU Session ID |
|---|---|---|---|
| Bridge-A | Port-B | UE-b | PS-b1 |
| Bridge-A | Port-B | UE-b | PS-b2 |

TSN parameters / 5GS parameters

FIG. 15

METHODS AND APPARATUSES FOR LOGICAL TSN BRIDGE

TECHNICAL FIELD

Embodiments of the disclosure generally relate to communication, and, more particularly, to methods and apparatuses for logical time sensitive network (TSN) bridge.

BACKGROUND

This section introduces aspects that may facilitate better understanding of the present disclosure. Accordingly, the statements of this section are to be read in this light and are not to be understood as admissions about what is in the prior art or what is not in the prior art.

Institute of electrical and electronics engineers (IEEE) 802.1Q specifies the Bridge Configuration object which models the configuration of the Bridge's resources. There is a single Bridge Configuration object per Bridge. The Bridge Configuration information of a Bridge includes: Bridge Address, Bridge Name, Number of Ports, Port Addresses, and Uptime. Bridge Address is the MAC address for the Bridge. Bridge Name is a text string of up to 32 characters, of locally determined significance. Number of Ports is the number of Bridge Ports (media access control (MAC) Entities). Port Addresses are a list specifying the following for each Port: 1) Port Number, which is the number of the Bridge Port; and 2) Port Address, which is the specific MAC address of the individual MAC Entity associated with the Port. Port Number is an unsigned value assigned to a Port as part of a Port Identifier (ID). Valid Port Numbers are in the range 1 through 4095.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for logical TSN bridge.

According to a first aspect of the disclosure, there is provided a method in a session management node. The method comprises receiving, from a mobility management node in a mobile network, a first request for establishing a protocol data unit (PDU) session for a terminal device which is associated with a port of a logical time sensitive network (TSN) bridge. The method further comprises obtaining a first port number of the logical TSN bridge at the side of the terminal device. The method further comprises obtaining configuration information of the logical TSN bridge at a side of a user plane node corresponding to the PDU session.

In this way, the PDU session establishment procedures can be enhanced for adaptation of TSN requirement.

In an embodiment of the disclosure, the configuration information at the side of the user plane node comprises one or more of: a second port number of the logical TSN bridge at the side of the user plane node; a bridge identifier (ID) identifying the logical TSN bridge; and a bridge name of the logical TSN bridge.

In an embodiment of the disclosure, the method further comprises receiving, from the mobility management node, a port address of the logical TSN bridge at the side of the terminal device.

In an embodiment of the disclosure, a mapping between at least one TSN parameter and at least one mobile network parameter is maintained at the session management node for the side of the terminal device and the side of the user plane node respectively.

In an embodiment of the disclosure, the at least one TSN parameter for the side of the terminal device comprises the first port number and the at least one TSN parameter for the side of the user plane node is from the configuration information.

In an embodiment of the disclosure, the at least one mobile network parameter for the side of the terminal device comprises a first ID identifying the PDU session. The at least one mobile network parameter for the side of the user plane node comprises a second ID identifying a second session between the session management node and the user plane node.

In an embodiment of the disclosure, the method further comprises sending the first port number and the bridge ID to the terminal device via the mobility management node.

In an embodiment of the disclosure, the method further comprises sending, to the user plane node, a mapping between the first port number and a second ID identifying a second session between the session management node and the user plane node.

In an embodiment of the disclosure, the mapping between the first port number and the second ID is sent in a Session Modification Request message.

In an embodiment of the disclosure, the method further comprises sending, to the user plane node, the port address at the side of the terminal device.

In an embodiment of the disclosure, the method further comprises sending, to a policy control node, the mapping maintained for the PDU session.

In an embodiment of the disclosure, obtaining the first port number comprises determining the first port number for the terminal device.

In an embodiment of the disclosure, obtaining the first port number comprises sending, to the user plane node, a second request for obtaining the first port number for the terminal device. Obtaining the first port number further comprises receiving the first port number from the user plane node.

In an embodiment of the disclosure, obtaining the configuration information comprises determining the configuration information for the user plane node.

In an embodiment of the disclosure, obtaining the configuration information comprises sending, to the user plane node, a third request for obtaining the configuration information. Obtaining the configuration information further comprises receiving the configuration information from the user plane node.

In an embodiment of the disclosure, the user plane node is controlled by the session management node and at least one additional session management node. The first port number at the side of the terminal device and the configuration information at the side of the user plane node are stored in a data storage node that can be accessed by the session management node and the at least one additional session management node.

In an embodiment of the disclosure, the session management node is a session management function (SMF). The mobility management node is an access and mobility management function (AMF). The user plane node is a user plane function (UPF).

According to a second aspect of the disclosure, there is provided a method in a user plane node. The method comprises receiving, from a session management node, a first request for obtaining a first port number of a logical TSN bridge at a side of a terminal device. The method further comprises determining the first port number for the terminal device. The method further comprises determining configuration information of the logical TSN bridge at a side of the user plane node. The method further comprises sending the determined first port number and configuration information to the session management node.

In an embodiment of the disclosure, the configuration information is determined in response to a second request from the session management node.

In an embodiment of the disclosure, the configuration information at the side of the user plane node comprises one or more of: a second port number of the logical TSN bridge at the side of the user plane node; a bridge ID identifying the logical TSN bridge; and a bridge name of the logical TSN bridge.

In an embodiment of the disclosure, the method further comprises receiving, from the session management node, a mapping between the first port number and an ID identifying a session between the session management node and the user plane node.

In an embodiment of the disclosure, the method further comprises receiving, from the session management node, a port address of the logical TSN bridge at the side of the terminal device.

According to a third aspect of the disclosure, there is provided a method in a terminal device. The method comprises sending, to a mobility management node in a mobile network, a request for establishing a PDU session for the terminal device which is associated with a port of a logical TSN bridge. The method further comprises receiving, from the mobility management node, a first port number of the logical TSN bridge at the side of the terminal device and a bridge ID of the logical TSN bridge.

In an embodiment of the disclosure, a mapping between TSN parameters and at least one mobile network parameter is maintained at the terminal device. The TSN parameter comprise the first port number and the bridge ID.

In an embodiment of the disclosure, the at least one mobile network parameter comprises an ID identifying the PDU session.

In an embodiment of the disclosure, the method further comprises sending, to the mobility management node, a port address of the logical TSN bridge at the side of the terminal device.

In an embodiment of the disclosure, multiple PDU sessions are established for the same port of the logical TSN bridge at the side of the terminal device.

In an embodiment of the disclosure, the first port number for the same port at the side of the terminal device is bound with the multiple PDU sessions in a mapping between TSN parameters and at least one mobile network parameter.

According to a fourth aspect of the disclosure, there is provided a session management node. The session management node comprises at least one processor and at least one memory. The at least one memory contains instructions executable by the at least one processor, whereby the session management node is operative to receive, from a mobility management node in a mobile network, a first request for establishing a PDU session for a terminal device which is associated with a port of a logical TSN bridge. The session management node is further operative to obtain a first port number of the logical TSN bridge at the side of the terminal device. The session management node is further operative to obtain configuration information of the logical TSN bridge at a side of a user plane node corresponding to the PDU session.

In an embodiment of the disclosure, the session management node is operative to perform the method according to the above first aspect.

According to a fifth aspect of the disclosure, there is provided a user plane node. The user plane node comprises at least one processor and at least one memory. The at least one memory contains instructions executable by the at least one processor, whereby the user plane node is operative to receive, from a session management node, a first request for obtaining a first port number of a logical TSN bridge at a side of a terminal device. The user plane node is further operative to determine the first port number for the terminal device. The user plane node is further operative to determine configuration information of the logical TSN bridge at a side of the user plane node. The user plane node is further operative to send the determined first port number and configuration information to the session management node.

In an embodiment of the disclosure, the user plane node is operative to perform the method according to the above second aspect.

According to a sixth aspect of the disclosure, there is provided a terminal device. The terminal device comprises at least one processor and at least one memory. The at least one memory contains instructions executable by the at least one processor, whereby the terminal device is operative to send, to a mobility management node in a mobile network, a request for establishing a PDU session for the terminal device which is associated with a port of a logical TSN bridge. The terminal device is further operative to receive, from the mobility management node, a first port number of the logical TSN bridge at the side of the terminal device and a bridge ID of the logical TSN bridge.

In an embodiment of the disclosure, the terminal device is operative to perform the method according to the above third aspect.

According to a seventh aspect of the disclosure, there is provided a computer program product. The computer program product comprises instructions which when executed by at least one processor, cause the at least one processor to perform the method according to any of the above first to third aspects.

According to an eighth aspect of the disclosure, there is provided a computer readable storage medium. The computer readable storage medium comprises instructions which when executed by at least one processor, cause the at least one processor to perform the method according to any of the above first to third aspects.

According to a ninth aspect of the disclosure, there is provided a session management node. The session management node comprises a reception module for receiving, from a mobility management node in a mobile network, a first request for establishing a PDU session for a terminal device which is associated with a port of a logical TSN bridge. The session management node further comprises a first obtaining module for obtaining a first port number of the logical TSN bridge at the side of the terminal device. The session management node further comprises a second obtaining module for obtaining configuration information of the logical TSN bridge at a side of a user plane node corresponding to the PDU session.

According to a tenth aspect of the disclosure, there is provided a user plane node. The user plane node comprises a reception module for receiving, from a session management node, a first request for obtaining a first port number of a logical TSN bridge at a side of a terminal device. The user plane node further comprises a first determination module for determining the first port number for the terminal device. The user plane node further comprises a second determination module for determining configuration information of the logical TSN bridge at a side of the user plane node. The user plane node further comprises a sending module for sending the determined first port number and configuration information to the session management node.

According to an eleventh aspect of the disclosure, there is provided a terminal device. The terminal device comprises a sending module for sending, to a mobility management node in a mobile network, a request for establishing a PDU session for the terminal device which is associated with a port of a logical TSN bridge. The terminal device further comprises a reception module for receiving, from the mobility management node, a first port number of the logical TSN bridge at the side of the terminal device and a bridge ID of the logical TSN bridge.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIGS. 7A-7B illustrate examples of a mapping table at an SMF;

FIG. 8 illustrates another example of a mapping table at an SMF;

FIG. 11 illustrates an example of a mapping table at a UPF;

FIG. 12 is a flowchart illustrating a method implemented at a terminal device according to an embodiment of the disclosure;

FIG. 13 illustrates an example of a mapping table at a UE;

FIG. 14 illustrates another example of a mapping table at a UE;

FIG. 15 illustrates another example of a mapping table at a UE;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

The document S2-1906772 entitled "Address editor's notes for 5G Bridge management and QoS mapping" has been agreed in SA2 #133 meeting, but some issues and editor notes need be further discussed and resolved. According to the editor's notes in clause 5.28 of 3rd generation partnership project (3GPP) technical specification (TS) 23.501 V16.0.2, it is for further study (FFS) whether session management function (SMF) or user plane function (UPF) allocates Port ID on the device side (DS)-TSN translator (TT), and how the port ID on the DS-TT side is sent to the user equipment (UE). It is FFS if additional information is needed. The details of how to transparently convey port management information between TSN application function (AF) and DS-TT/network (NW)-TT (including how to determine whether the related port is located in DS-TT or NW-TT) is FFS.

In addition, link layer discovery protocol (LLDP) is used by 5G logical bridge for topology discovery (according to IEEE 802.1AB), but how to manage and report the MAC address of DS-TT and NW-TT to 5GS has not been specified.

The present disclosure proposes a solution for logical TSN bridge by mainly discussing the following issues: 1) the allocation of 5G logical bridge port numbers; 2) how to maintain and distribute the bridge information and mapping tables between bridge ports and 5G parameters (in both control plane and data plane); 3) how to enhance the PDU Session Establishment procedures for the adaptation of TSN requirement; and 4) the management of port MAC addresses in a 5G logical bridge. Hereinafter, the solution will be described in detail with reference to FIGS. 1-20.

Figure 1:
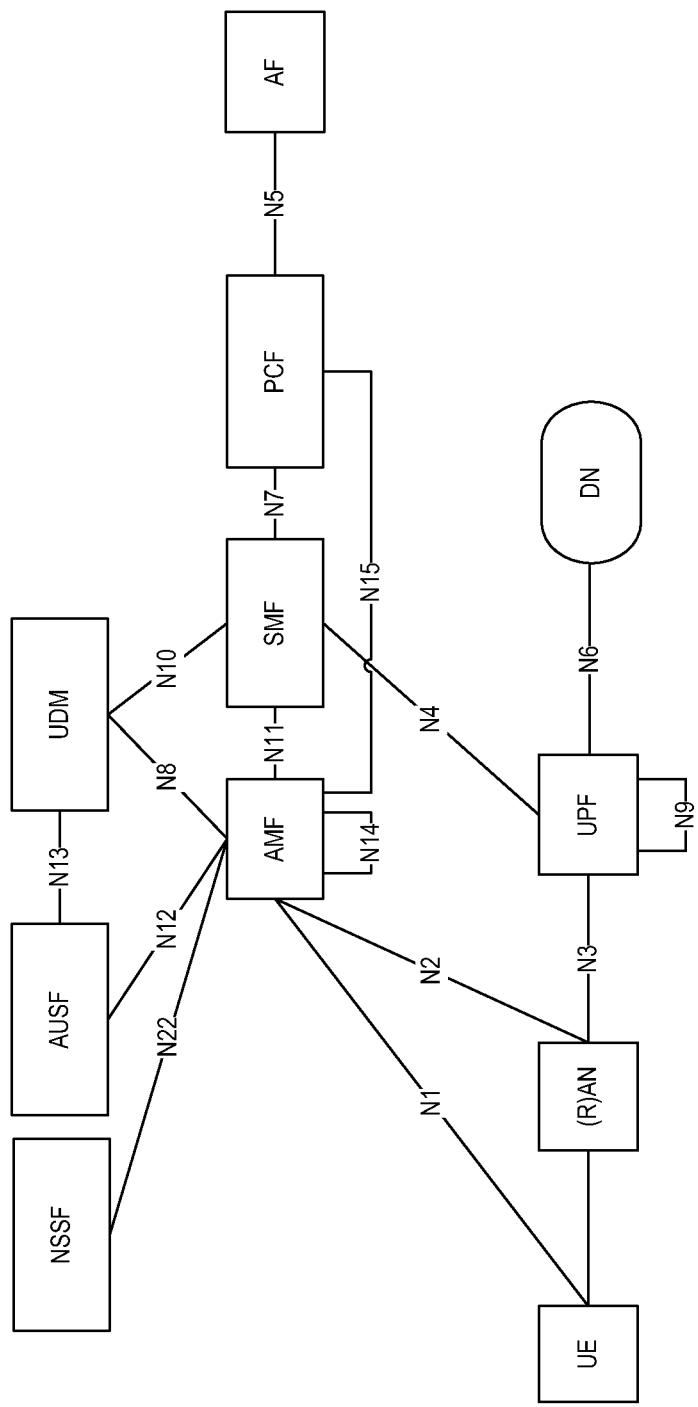
FIG. 1 is a diagram showing an exemplary communication system into which an embodiment of the disclosure is applicable.

FIG. 1 is a diagram showing an exemplary communication system into which an embodiment of the disclosure is applicable. As shown, the communication system comprises a user equipment (UE), a (radio) access network ((R)AN), a user plane function (UPF), a data network (DN), an access and mobility management function (AMF), a session management function (SMF), a policy control function (PCF), an application function (AF), a short message service function (SMSF), a network slice selection function (NSSF), an authentication server function (AUSF), a unified data management (UDM) and a unified data repository (UDR). The functional description of the above entities is specified in clause 6 of 3GPP TS 23.501, which is incorporated herein by reference in its entirety.

Note that within the context of this disclosure, the term terminal device (or UE) encompasses a device which is able to communicate with a network node, such as a base station, or with another wireless device by transmitting and/or receiving wireless signals. In other words, the term terminal device or UE used herein may also be referred to as, for example, access terminal, mobile station, mobile unit, subscriber station, or the like. It may refer to any (a stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Figure 2:
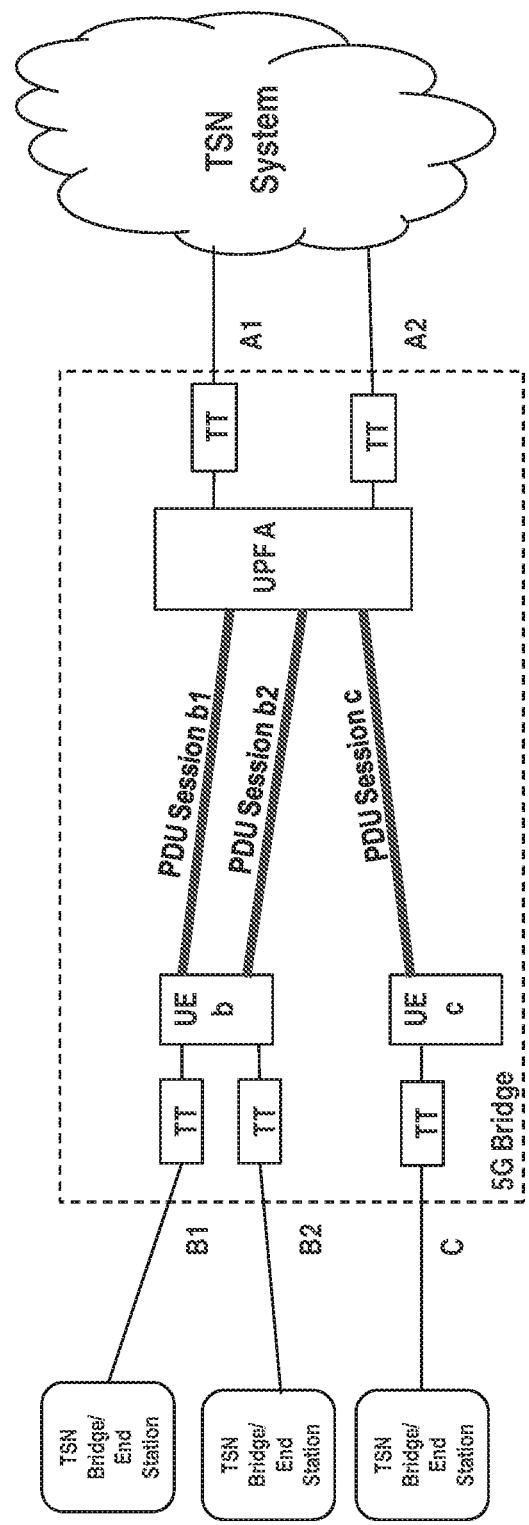
FIG. 2 illustrates an application example of the exemplary communication system of FIG. 1.

FIG. 2 illustrates an application example of the exemplary communication system of FIG. 1. In this application example, a logical (or virtual) bridge is established in the 5GS to connect TSN bridges/end stations and the TSN system. As specified in clause 5.29.1 of TS 23.501, the 5G Bridge may be composed of the ports on the UPF (i.e. PDU session anchor (PSA)) side, the user plane tunnel between the UE and the UPF, and the ports on the UE/DS-TT side. The granularity of the logical TSN bridge may be per UPF. As shown, the logical bridge has three ports at the UE side and two ports at the UPF side. At the UE side, the TT may be a component integrated in the UE or a physical entity separate from the UE. Similarly, at the UPF side, the TT may be a component integrated in the UPF or a physical entity separate from the UPF.

The 5G logical bridge can emulate the behavior of a TSN bridge in order to facilitate its integration with the TSN system, minimizing the impact to other TSN entities (such as centralized network controller (CNC), centralized user configuration (CUC), end-stations and other bridges). On one hand, the 5G logical bridge can maintain the similar Bridge Configuration information as described above, which can be reported to CNC or exposed to other connected TSN bridges/End stations. On the other hand, the 5GS can maintain the forwarding capabilities (e.g. PDU sessions, quality of service (QoS) flows) to transfer the frames between the ports in the 5G logical bridge. A set of mapping tables can be maintained to bind the bridge ports and correlated 5G forwarding capabilities, both in control plane and data plane. More details of the parameters in the mapping tables and procedures for the creation and distribution of the mapping tables will be provided hereinafter.

Figure 3:
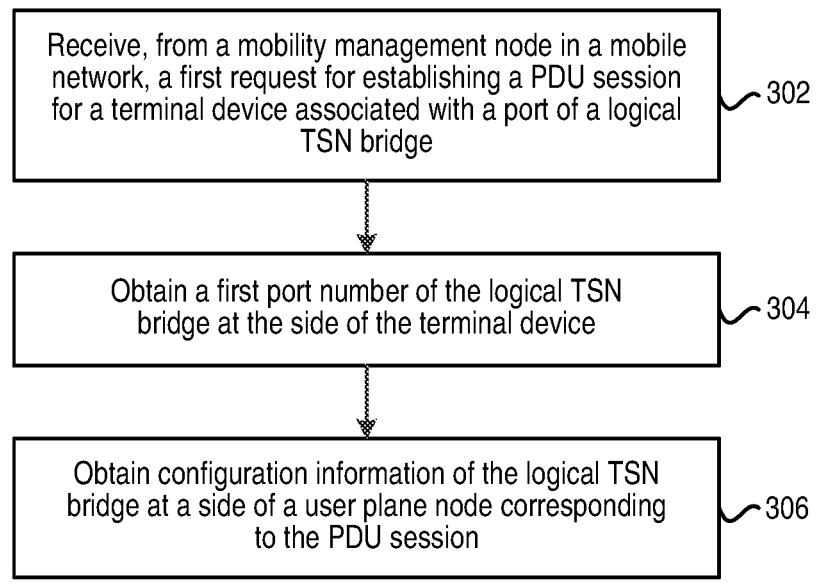
FIG. 3 is a flowchart illustrating a method implemented at a session management node according to an embodiment of the disclosure.
Figure 4:
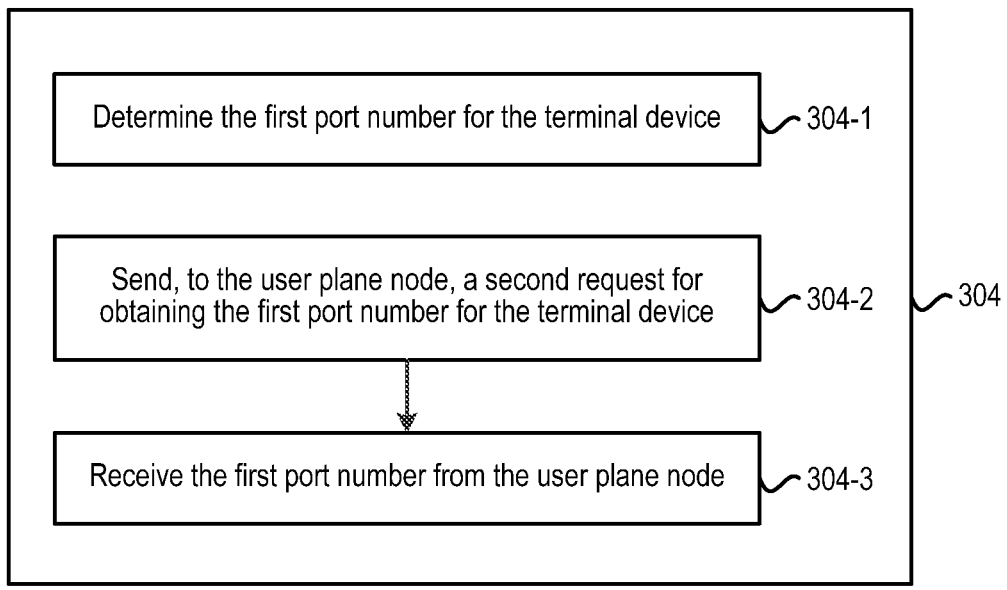
FIG. 4 is a flowchart for explaining the method of FIG. 3.
Figure 5:
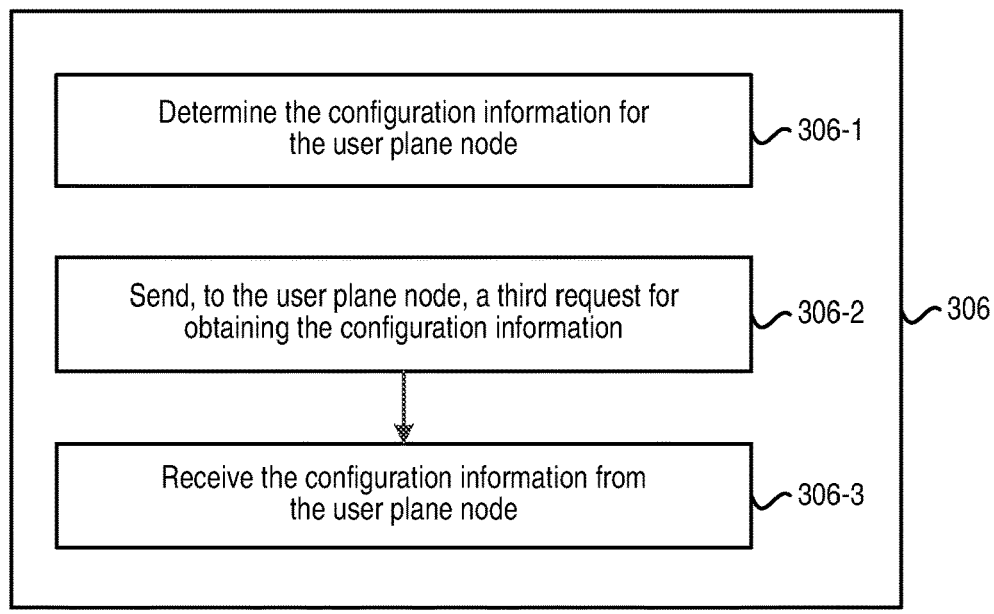
FIG. 5 is a flowchart for explaining the method of FIG. 3.

FIG. 3 is a flowchart illustrating a method implemented at a session management node according to an embodiment of the disclosure. The session management node may be an SMF or any other entity having similar functionality. At block 302, the session management node receives, from a mobility management node in a mobile network, a first request for establishing a PDU session for a terminal device which is associated with a port of a logical TSN bridge. The mobility management node may be an AMF or any other entity having similar functionality. As an exemplary example, the mobile network may be a 5G network. The port of the logical TSN bridge may be a TSN translator integrated in the terminal device or connected to the terminal device.

The first request may contain identification information of the PDU session (e.g. a PDU session ID), identification information of the terminal device (e.g. a UE ID such as subscription permanent identifier (SUPI)) and identification information of the destination (e.g. a data network name (DNN)). For example, according to the DNN, the session management node may determine that there is a need to obtain related TSN parameter(s) for the terminal device. In the case of 5GS, the first request may be an Nsmf_PDUSession_CreateSMContext Request, where the term "SM" refers to session management.

At block 304, the session management node obtains a first port number of the logical TSN bridge at the side of the terminal device. Block 304 may be implemented as block 304-1 or blocks 304-2-304-3. At block 304-1, the session management node determines the first port number for the terminal device. For example, an unused number may be selected from the valid port number range (e.g., 1 through 4095) in any suitable manner to act as the first port number. As another option, at block 304-2, the session management node sends, to the user plane node, a second request for obtaining the first port number for the terminal device. The user plane node may be a UPF or any other entity having similar functionality. The second request may contain identification information of the terminal device, and identification information of the port associated with the terminal device. In this case, the first port number may be determined by the user plane node. In the case of 5GS, the second request may be an N4 Session Establishment Request or any other suitable message over N4 reference point. At block 304-3, the session management node receives the first port number from the user plane node.

At block 306, the session management node obtains configuration information of the logical TSN bridge at a side of a user plane node corresponding to the PDU session. The configuration information at the side of the user plane node may comprise, but not limited to, one or more of: a second port number of the logical TSN bridge at the side of the user plane node; a bridge ID identifying the logical TSN bridge; and a bridge name of the logical TSN bridge. For example, block 306 may be implemented as blocks 306-2-306-3. At block 306-2, the session management node sends, to the user plane node, a third request for obtaining the configuration information. In the case of 5GS, the third request may be an N4 Session Establishment Request or any other suitable message over N4 reference point. At block 306-3, the session management node receives the configuration information from the user plane node.

Alternatively, the user plane node may actively report the configuration information to the session management node. In this case, the session management node may receive the configuration information without the third request. Alternatively, the session management node may determine the configuration information for the user plane node, as shown at block 306-1. For example, the configuration information may be determined according to preconfiguration in the session management node. With the method including blocks 302-306, the PDU session establishment procedures can be enhanced for adaptation of TSN requirement.

A mapping between at least one TSN parameter and at least one mobile network parameter may be maintained at the session management node for the side of the terminal device and the side of the user plane node respectively. For example, the mapping may take the form of a table. For the side of the terminal device, the at least one TSN parameter may comprise, but not limited to, the first port number, and the at least one mobile network parameter may comprise, but not limited to, a first ID identifying the PDU session. For the side of the user plane node, the at least one TSN parameter may be selected from the configuration information, and the at least one mobile network parameter may comprise, but not limited to, a second ID identifying a second session (e.g. an N4 session in 5GS) between the session management node and the user plane node.

Optionally, in a case that the user plane node is controlled by the session management node and at least one additional session management node, the first port number at the side of the terminal device and the configuration information at the side of the user plane node may be stored in a data storage node (e.g., an unstructured data storage network function (UDSF)) that can be accessed by the session management node and the at least one additional session management node.

Figure 6:
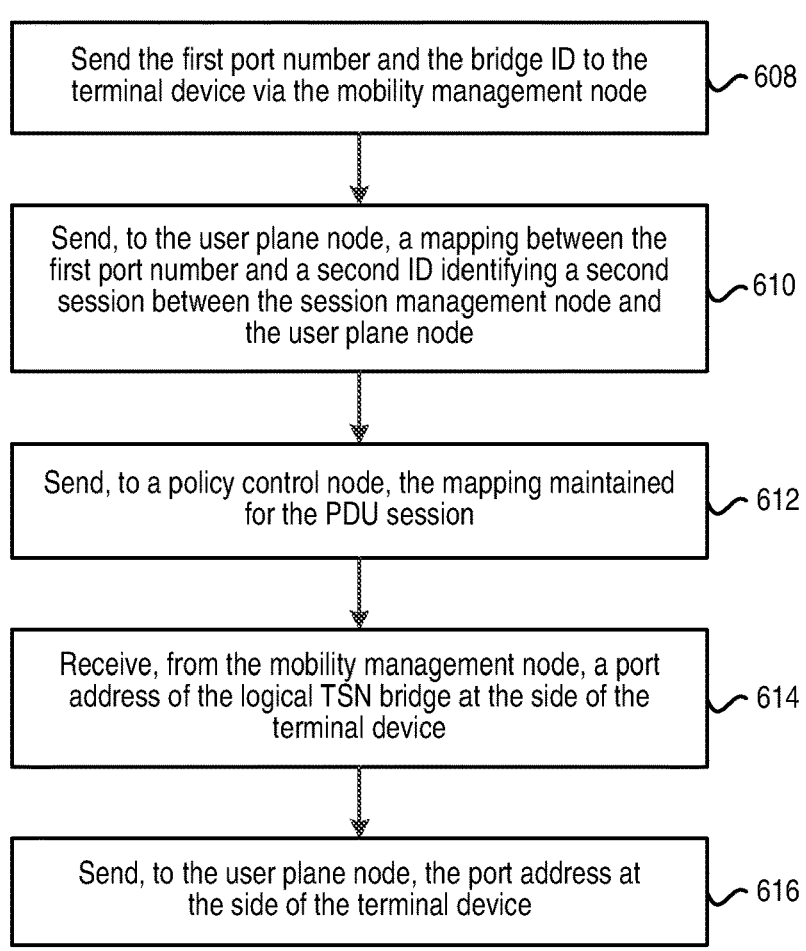
FIG. 6 is a flowchart illustrating a method implemented at a session management node according to an embodiment of the disclosure.

FIG. 6 is a flowchart illustrating a method implemented at a session management node according to an embodiment of the disclosure. At block 608, the session management node sends the first port number and the bridge ID to the terminal device via the mobility management node. At block 610, the session management node sends, to the user plane node, a mapping between the first port number and a second ID identifying a second session between the session management node and the user plane node. In the case of 5GS, the mapping may be sent in a Session Modification Request message or any other suitable message over N4 reference point. At block 612, the session management node sends, to a policy control node, the mapping maintained for the PDU session. The policy control node may be a PCF or any other entity having similar functionality. With blocks 608-612, the PDU Session Establishment procedures can be enhanced for delivery of port information.

At block 614, the session management node receives, from the mobility management node, a port address of the logical TSN bridge at the side of the terminal device. In this way, the bridge management information can be updated with the port address at the side of the terminal device. The port address may be the MAC address of the TSN translator associated with the terminal device. In the case of 5GS, the port address may be received in a UE initiated PDU Session Modification procedure. At block 616, the session management node sends, to the user plane node, the port address at the side of the terminal device.

Optionally, additional parameters/indicators may be added to the bridge and port mapping table to indicate a set of special properties of a port or a bridge. Since the 5G system is modeled as logical bridges, such indicators may be useful to inform external management or configuration entities (e.g. CNC) about special properties of a 5G logical bridge. For example, an indicator may be associated with a bridge ID. The indicator as part of the mapping table then may be reported to the AF, so that the CNC can read the indicator and know this is a special bridge (5G logical bridge). A use case of this indicator may be indicating that the 5G logical bridge is only support exclusive gating feature of the IEEE 802.1Qbv, so that CNC will treat the 5G bridge specially.

FIGS. 7A-7B illustrate examples of a mapping table maintained in an SMF. The two examples shown in FIGS. 7A-7B and subsequent examples of mapping tables shown in other figures are based on the application example of FIG. 2. FIG. 7A corresponds to the case that the port addresses on both sides (DS-TT and NW-TT) are not collected by the SMF, while FIG. 7B corresponds to the case that the port addresses on both sides (DS-TT and NW-TT) are collected by the SMF. The symbol "-" shown in the first two rows of the mapping tables means that there are multiple corresponding IDs (e.g. UE IDs, PDU Session IDs, or N4 Session IDs) for the UPF port number (UP-a1 or UP-a2). Similarly, the symbol "-" shown in the third to fifth rows of the mapping tables means that there are multiple UPF Port numbers for N4 Session ID (N4-b1, N4-b2, or N4-c).

FIG. 8 illustrates another example of a mapping table maintained at an SMF. In this example, the mapping is made based on multiple virtual UPF ports. Every virtual UPF port is associated with one PDU session. Then several virtual ports can be mapped to one or more UPF physical ports.

Figure 9:
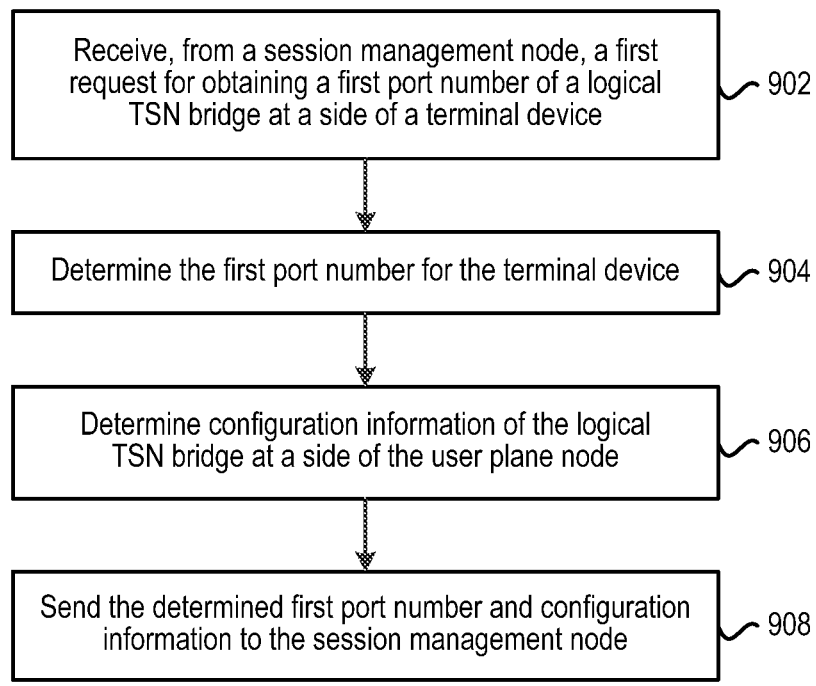
FIG. 9 is a flowchart illustrating a method implemented at a user plane node according to an embodiment of the disclosure.

FIG. 9 is a flowchart illustrating a method implemented at a user plane node according to an embodiment of the disclosure. The user plane node may be a UPF or any other entity having similar functionality. At block 902, the user plane node receives, from a session management node, a first request for obtaining a first port number of a logical TSN bridge at a side of a terminal device. The first request may contain identification information of the terminal device, and identification information of the port associated with the terminal device. In the case of 5GS, the first request may be an N4 Session Establishment Request or any other suitable message over N4 reference point.

At block 904, the user plane node determines the first port number for the terminal device. For example, an unused number may be selected from the valid port number range (e.g., 1 through 4095) in any suitable manner to act as the first port number. At block 906, the user plane node determines configuration information of the logical TSN bridge at a side of the user plane node. For example, the configuration information may be determined in response to the first request, or in response to a different second request from the session management node. The configuration information at the side of the user plane node may comprise, but not limited to, one or more of: a second port number of the logical TSN bridge at the side of the user plane node; a bridge ID identifying the logical TSN bridge; and a bridge name of the logical TSN bridge. For example, the configuration information may be determined according to preconfiguration in the user plane node. At block 908, the user plane node sends the determined first port number and configuration information to the session management node.

As another embodiment, the present disclosure further provides a method implemented at a user plane node. At a first step, the user plane node receives, from a session management node, a request for obtaining configuration information of a logical TSN bridge at a side of the user plane node. In the case of 5GS, the request may be an N4 Session Establishment Request or any other suitable message over N4 reference point. At a second step, the user plane node determines the configuration information. At a third step, the user plane node sends the determined configuration information to the session management node.

As another embodiment, the present disclosure further provides a method implemented at a user plane node. At a first step, the user plane node receives, from a session management node, a request for obtaining a first port number of a logical TSN bridge at a side of a terminal device. At a second step, the user plane node determines the first port number for the terminal device. At a third step, the user plane node sends the determined first port number to the session management node.

Figure 10:
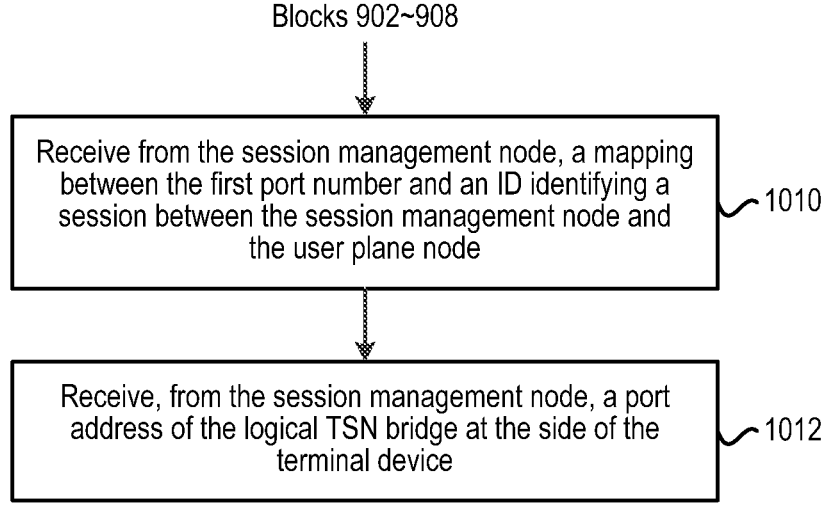
FIG. 10 is a flowchart illustrating a method implemented at a user plane node according to an embodiment of the disclosure.

FIG. 10 is a flowchart illustrating a method implemented at a user plane node according to an embodiment of the disclosure. At block 1010, the user plane node receives, from the session management node, a mapping between the first port number and an ID identifying a session between the session management node and the user plane node. In the case of 5GS, the mapping may be sent in a Session Modification Request message or any other suitable message over N4 reference point. At block 1012, the user plane node receives, from the session management node, a port address of the logical TSN bridge at the side of the terminal device. Additionally, the user plane node may send, to the session management node, a port address of the logical TSN bridge at the side of the user plane node.

Similar to the session management node, a mapping between at least one TSN parameter and at least one mobile network parameter may be maintained at the user plane node for the side of the terminal device and the side of the user plane node respectively, as shown in FIG. 11.

FIG. 12 is a flowchart illustrating a method implemented at a terminal device according to an embodiment of the disclosure. At block 1202, the terminal device sends, to a mobility management node in a mobile network, a request for establishing a PDU session for the terminal device which is associated with a port of a logical TSN bridge. In the case of 5GS, the request may be a PDU Session Establishment Request. At block 1204, the terminal device receives, from the mobility management node, a first port number of the logical TSN bridge at the side of the terminal device and a bridge ID of the logical TSN bridge.

A mapping between TSN parameters and at least one mobile network parameter may be maintained at the terminal device. The TSN parameter may comprise, but not limited to, the first port number and the bridge ID. The at least one mobile network parameter may comprise, but not limited to, an ID identifying the PDU session. FIG. 13 illustrates an example of a mapping table maintained at a UE. It shows the case for "UE-C" in FIG. 2. As shown, the port(s) are associated with bridge(s). The examples in this document uses the granularity of per UPF based logical TSN bridge as specified in clause 5.28.1 of TS 23.501. Therefore, the Bridge ID is linked to a UPF.

FIG. 14 illustrates another example of a mapping table maintained at a UE. It corresponds to the scenario that the UE is connected to multiple DS-TTs or has a single DS-TT with multiple ports and multiple PDU sessions are established independently for each port. As shown, the UE can store a mapping table with multiple port numbers and binding them with PDU Sessions. FIG. 15 illustrates another example of a mapping table maintained at a UE. It corresponds to the scenario that the UE may need to establish multiple PDU sessions serving for the same port in a DS-TT. As shown, the UE can store a mapping table with the port number and bind it with multiple PDU Sessions.

Optionally, at block 1206, the terminal device sends, to the mobility management node, a port address of the logical TSN bridge at the side of the terminal device. For example, the port address at the side of the terminal device may be sent in a PDU Session Establishment Request, a PDU Session Modification Request, or any other suitable message. In this way, the PDU Session Establishment procedures can be enhanced for the delivery of port address information.

Optionally, multiple PDU sessions may be established for the same port of the logical TSN bridge at the side of the terminal device. The first port number for the same port at the side of the terminal device may be bound with the multiple PDU sessions in the mapping maintained at the terminal device.

Figure 16:
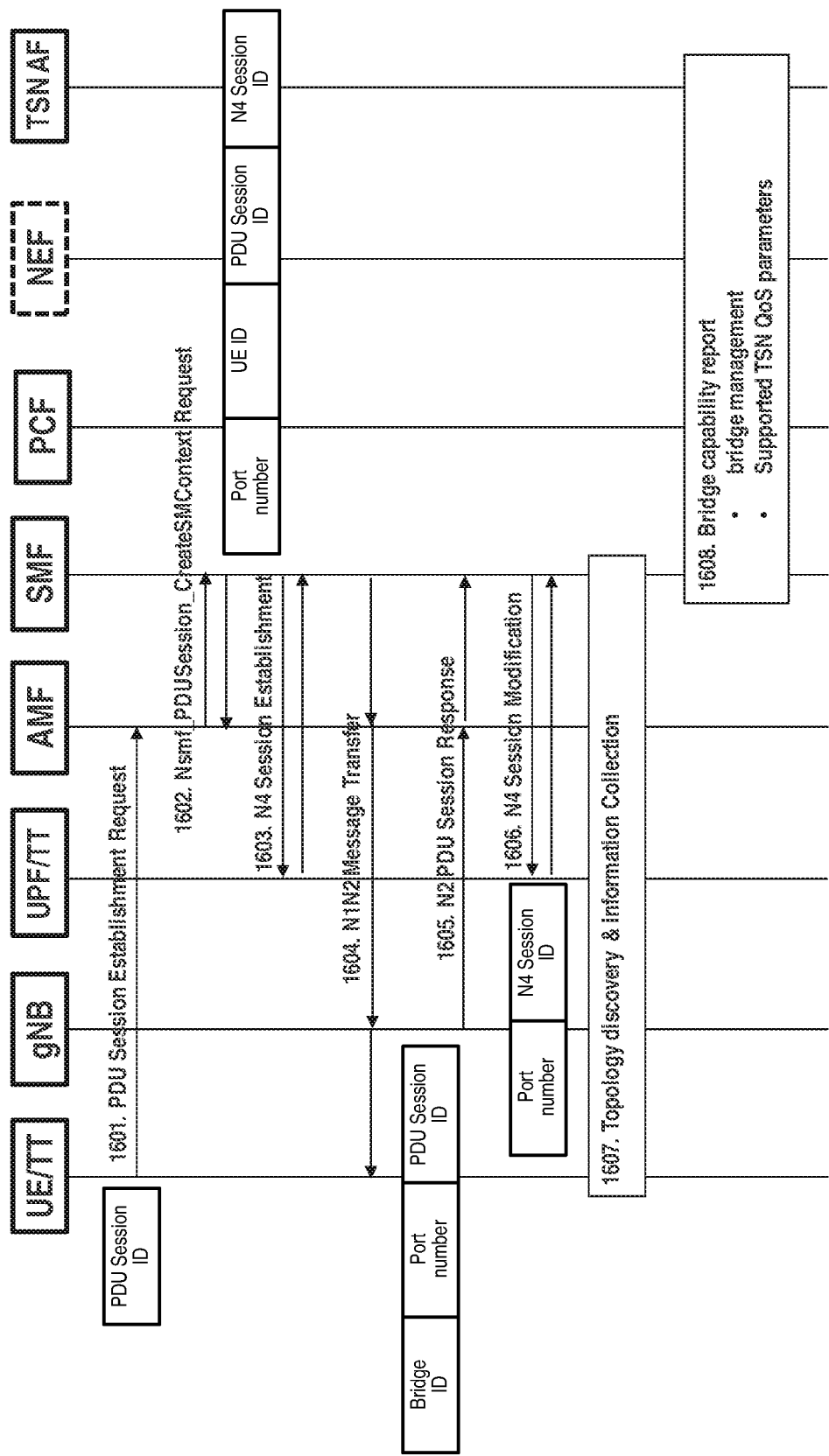
FIG. 16 is a flowchart illustrating an exemplary process according to an embodiment of the disclosure.

FIG. 16 is a flowchart illustrating an exemplary process according to an embodiment of the disclosure. In this process, the SMF collects related information and distributes it to other 5G NF (e.g. UE, UPF, TSN AF). Some of the initial Bridge Configuration information of a TSN Bridge (e.g. Bridge ID, Bridge Name, Port Number in UPF side) might be pre-configured in the UPF and reported to the SMF before the UE's onboarding (e.g. PDU Session Establishment). When a new PDU Session is established for TSN traffic, the procedures specified in clause 4.3 of 3GPP TS 23.502 is enhanced and some new capabilities and parameters are applied for TSN adaptation. More details of the process will be described below.

At block 1601, when a UE initiates a new connection to a TSN (identified by DNN or single network slice selection assistance information (S-NSSAI)) via 5G system, it sends a PDU Session Establishment Request to the network (the AMF), with a new PDU Session ID generated by the UE for the TSN. At block 1602, the AMF sends, to the SMF, an Nsmf_PDUSession_CreateSMContext Request which includes UE ID (e.g. SUPI) and PDU session ID.

Based on the PDU Session Establishment Request initiated by the UE, the SMF can identify that the target DNN is serving for a TSN. If the SMF decides to establish the PDU session, it selects the serving UPF. At block 1603, the SMF initiates an N4 Session Establishment procedure with the selected UPF, and provides Packet detection, enforcement and reporting rules to be installed on the UPF for this PDU Session. The core network (CN) Tunnel Info and TSN port number for the UE side is allocated by the SMF or the UPF. The SMF updates the bridge management information (mapping table of TSN ports).

There may be two alternatives for the allocation of Port Number of the UE side (e.g. DS-TT). As the first alternative, it may be allocated by the SMF. As the second alternative, it may be allocated by the UPF then reported to the SMF via N4 reference point.

The allocation of Bridge ID (MAC address of a Bridge), Bridge name, and Port Number in the UPF side (e.g. NW-TT) can be pre-configured in the UPF, then reported to the SMF via N4 reference point. More than one ports per UPF can be configured to connected to the TSN (for example, port-A1 and port-A2 in FIG. 2).

There can be multiple PDU sessions in a UPF (e.g. thousands of PDU sessions), but only the PDU session(s) that used for TSN purpose are needed to be mapped to a physical port(s) at the UPF side. Thus, optionally, only PDU session(s) that are used for TSN purpose are required to be reported to the "bridge and ports mapping table" and then exposed (via the NEF) to the AF, so that the TSN can use them.

Based on the information collected from the UE and the UPF, the SMF can maintain (create/update) the bridge configuration information, which may include:
Bridge ID (MAC address of the Bridge),
(optionally) Bridge name Number of Ports, A list of Port Numbers and (optionally) corresponding MAC addresses.

Optionally, in the scenarios of a UPF controlled by multiple SMFs, the bridge configuration information can be stored in a separate storage (e.g. UDSF), which can be accessed by multiple SMFs.

The SMF can also maintain (create/update) a mapping table to indicate the binding relationship between the Port Number and 5G parameters serving the UE connections (e.g. UE ID, PDU Session ID, N4 Session ID).

At block 1604, the SMF sends Namf_Communication_N1N2MessageTransfer to the UE & the RAN via the AMF. The AMF forwards the CN Tunnel Info (for uplink (UL) traffic) and QoS profiles to the RAN. The AMF delivers QoS rules and Bridge ID and allocated TSN port number for the UE side (e.g. DS-TT) to the UE. The UE may store the mapping table and maintain the binding between the port number and its PDU Session ID.

At block 1605, the RAN sends, to the AMF, an N2 PDU Session Response including access network (AN) Tunnel info (for downlink (DL) traffic). The AMF forwards the N2 SM information received from RAN to the SMF.

After the SMF receives the PDU Session response from the RAN, the SMF initiates an N4 Session Modification procedure to the UPF at block 1606. The SMF provides the AN Tunnel Info to the UPF as well as necessary Bridge Management information such as the mapping table of TSN ports (DS-TT to N4 Session ID) in the UPF. The UPF can create/update the mapping table of the Bridge, to keep the binding relationship between the Port Numbers (in UE side) and N4 Session ID.

At block 1607, the SMF collects the topology information from the UE/DS-TT. At block 1608, the SMF updates the PCF about the port mapping table, so that the PCF can understand the relations between ports and the PDU sessions, etc. so that PCF can set up corresponding policy and charging control (PCC) rules. The PCF (directly or via the NEF) updates the Bridge capabilities in the TSN AF.

Optionally, in the above process, when the UE initiates a new connection to the TSN, it can piggyback the MAC address of the UE side (e.g. DS-TT) in PDU Session Establishment Request/PDU Session Modification Request to the SMF. In this way, the bridge management information can be updated with the MAC address of the port (DS-TT). Note that how the UE achieves the MAC address of the DS-TT is up to implementation. Correspondingly, the SMF maintains the binding between the MAC address and allocated Port number for the DS-TT, as well as the PDU session ID, N4 Session ID. In this way, the Bridge Configuration information can be updated with a list of Port number and Port MAC address. In addition, the MAC address information of connected DS-TT can be updated in the UPF via the interaction between the SMF and the UPF in N4 procedures.

Optionally, the MAC address of the UPF/NW-TT port is reported by the UPF to the SMF via N4 reference point. In this way, the bridge management information can be updated with the MAC address of the port (NW-TT). Note that It is up to the implementation that multiple ports in the UPF/NW-TT may share the same MAC address (e.g. MAC-A1=MAC A2).

In this case, the SMF updates the PCF about the port mapping table, so that the PCF can understand the relations between ports, MAC and the PDU sessions, etc. so that PCF can set up corresponding PCC rules. The PCF (directly or via NEF) updates the Bridge capabilities in the TSN AF. It should be noted that two blocks shown in succession in the figures may, in fact, be executed substantially concurrently, or the blocks may sometimes be executed in the reverse order, depending upon the functionality involved.

Figure 17:
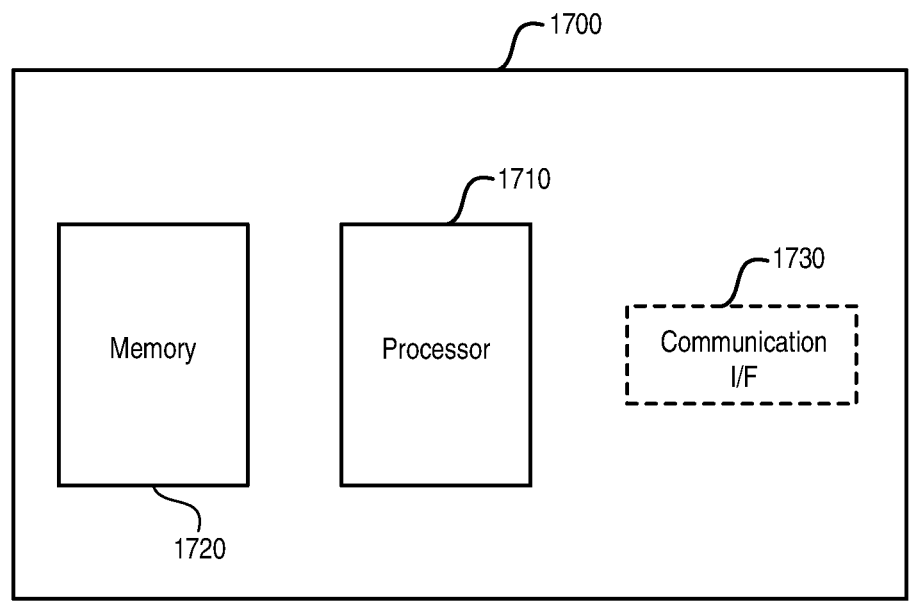
FIG. 17 is a block diagram showing an apparatus suitable for use in practicing some embodiments of the disclosure.

FIG. 17 is a block diagram showing an apparatus suitable for use in practicing some embodiments of the disclosure. For example, any one of the NF service provider, the NF service consumer and the repository node described above may be implemented through the apparatus 1700. As shown, the apparatus 1700 may include a processor 1710, a memory 1720 that stores a program, and optionally a communication interface 1730 for communicating data with other external devices through wired and/or wireless communication.

The program includes program instructions that, when executed by the processor 1710, enable the apparatus 1700 to operate in accordance with the embodiments of the present disclosure, as discussed above. That is, the embodiments of the present disclosure may be implemented at least in part by computer software executable by the processor 1710, or by hardware, or by a combination of software and hardware.

The memory 1720 may be of any type suitable to the local technical environment and may be implemented using any suitable data storage technology, such as semiconductor based memory devices, flash memories, magnetic memory devices and systems, optical memory devices and systems, fixed memories and removable memories. The processor 1710 may be of any type suitable to the local technical environment, and may include one or more of general purpose computers, special purpose computers, microprocessors, digital signal processors (DSPs) and processors based on multi-core processor architectures, as non-limiting examples.

Figure 18:
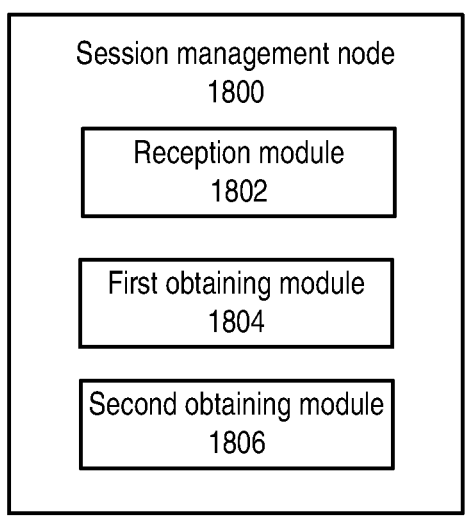
FIG. 18 is a block diagram showing a session management node according to an embodiment of the disclosure.

FIG. 18 is a block diagram showing a session management node according to an embodiment of the disclosure. As shown, the session management node 1800 comprises a reception module 1802, a first obtaining module 1804 and a second obtaining module 1806. The reception module 1802 may be configured to receive, from a mobility management node in a mobile network, a first request for establishing a PDU session for a terminal device which is associated with a port of a logical TSN bridge, as described above with respect to block 302. The first obtaining module 1804 may be configured to obtain a first port number of the logical TSN bridge at the side of the terminal device, as described above with respect to block 304. The second obtaining module 1806 may be configured to obtain configuration information of the logical TSN bridge at a side of a user plane node corresponding to the PDU session, as described above with respect to block 306.

Figure 19:
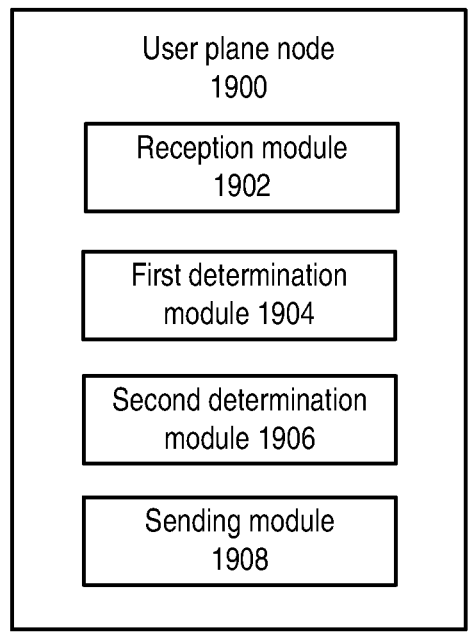
FIG. 19 is a block diagram showing a user plane node according to an embodiment of the disclosure.

FIG. 19 is a block diagram showing a user plane node according to an embodiment of the disclosure. As shown, the user plane node 1900 comprises a reception module 1902, a first determination module 1904, a second determination module 1906 and a sending module 1908. The reception module 1902 may be configured to receive, from a session management node, a first request for obtaining a first port number of a logical TSN bridge at a side of a terminal device, as described above with respect to block 902. The first determination module 1904 may be configured to determine the first port number for the terminal device, as described above with respect to block 904. The second determination module 1906 may be configured to determine configuration information of the logical TSN bridge at a side of the user plane node, as described above with respect to block 906. The sending module 1908 may be configured to send the determined first port number and configuration information to the session management node, as described above with respect to block 908.

Figure 20:
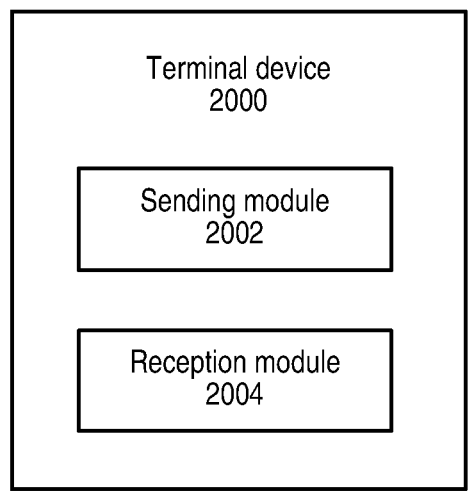
FIG. 20 is a block diagram showing a terminal device according to an embodiment of the disclosure.

FIG. 20 is a block diagram showing a terminal device according to an embodiment of the disclosure. As shown, the terminal device 2000 comprises a sending module 2002 and a reception module 2004. The sending module 2002 may be configured to send, to a mobility management node in a mobile network, a request for establishing a PDU session for the terminal device which is associated with a port of a logical TSN bridge, as described above with respect to block 1202. The reception module 2004 may be configured to receive, from the mobility management node, a first port number of the logical TSN bridge at the side of the terminal device and a bridge ID of the logical TSN bridge, as described above with respect to block 1204. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a user plane node comprising:
   receiving, from a session management node, a first request for obtaining a first port number of a logical time sensitive network (TSN) bridge at a side of a terminal device;
   determining the first port number for the terminal device;
   determining configuration information of the logical TSN bridge at a side of the user plane node; and
   sending the determined first port number and configuration information to the session management node.

2. The method according to claim 1, wherein the configuration information is determined in response to a second request from the session management node.

3. The method according to claim 1, wherein the configuration information at the side of the user plane node comprises one or more of:
   a second port number of the logical TSN bridge at the side of the user plane node; a bridge identifier (ID) identifying the logical TSN bridge; and a bridge name of the logical TSN bridge.

4. The method according to claim 1, further comprising:
   receiving, from the session management node, a mapping between the first port number and an ID identifying a session between the session management node and the user plane node.

5. The method according to claim 1, further comprising:
receiving, from the session management node, a port address of the logical TSN bridge at the side of the terminal device.

6. A method in a terminal device comprising:
sending, toward a mobility management node in a mobile network, a request for establishing a protocol data unit (PDU) session for the terminal device which is associated with a port of a logical time sensitive network (TSN) bridge; and
receiving, via the mobility management node, a first port number of the logical TSN bridge at a side of the terminal device.

7. The method according to claim 6, wherein a mapping between TSN parameters and at least one mobile network parameter is maintained at the terminal device, the TSN parameter comprising the first port number and the bridge ID.

8. The method according to claim 6, wherein the at least one mobile network parameter comprises an ID identifying the PDU session.

9. The method according to claim 6, further comprising:
including in the request for establishing the protocol data unit (PDU) session a port address of the logical TSN bridge at the side of the terminal device.

10. The method according to claim 6, wherein multiple PDU sessions are established for the same port of the logical TSN bridge at the side of the terminal device.

11. The method according to claim 10, wherein the first port number for the same port at the side of the terminal device is bound with the multiple PDU sessions in a mapping between TSN parameters and at least one mobile network parameter.

12. The method according to claim 6, wherein the receiving further comprises:
receiving, from the mobility management node, a bridge identifier (ID) of the logical TSN bridge.

13. The method according to claim 6, wherein the terminal device is connected to multiple Device Side-TSN Translators (DS-TTs) each having a single DS-TT port or to a single DS-TT having multiple DS-TT ports and a PDU session is established independently for each DS-TT port.

14. A user plane node comprising:
at least one processor; and
at least one memory, the at least one memory containing instructions executable by the at least one processor, whereby execution of the instructions causes the user plane node to:
receive, from a session management node, a first request for obtaining a first port number of a logical time sensitive network (TSN) bridge at a side of a terminal device;
determine the first port number for the terminal device;
determine configuration information of the logical TSN bridge at a side of the user plane node; and
send the determined first port number and configuration information to the session management node.

15. A terminal device comprising:
at least one processor; and
at least one memory, the at least one memory containing instructions executable by the at least one processor, whereby execution of the instructions causes the terminal device to:
send, toward a mobility management node in a mobile network, a request for establishing a protocol data unit (PDU) session for the terminal device which is associated with a port of a logical time sensitive network, TSN, bridge; and
receive, via the mobility management node, a first port number of the logical TSN bridge at a side of the terminal device.

* * * * *

UNITED STATES PATENT AND TRADEMARK OFFICE
CERTIFICATE OF CORRECTION

PATENT NO. : 12,108,350 B2
APPLICATION NO. : 17/616706
DATED : October 1, 2024
INVENTOR(S) : Zhang et al.

Page 1 of 1

It is certified that error appears in the above-identified patent and that said Letters Patent is hereby corrected as shown below:

On the Title Page

On Page 2, item (56), under "OTHER PUBLICATIONS", in Column 2, Line 23, delete "3GPP ," and insert -- 3GPP, --, therefor.

On Page 2, item (56), under "OTHER PUBLICATIONS", in Column 2, Line 28, delete "3GPP ," and insert -- 3GPP, --, therefor.

In the Specification

In Column 6, Line 15, delete "need be" and insert -- need to be --, therefor.

In the Claims

In Column 17, Lines 17-18, in Claim 7, delete "the bridge ID." and insert -- a bridge ID. --, therefor.

Signed and Sealed this
Twelfth Day of August, 2025

Coke Morgan Stewart
*Acting Director of the United States Patent and Trademark Office*